United States Patent
Kawamura et al.

(10) Patent No.: US 11,901,825 B2
(45) Date of Patent: Feb. 13, 2024

(54) ISOLATED DC-DC CONVERTER

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ibuki Kawamura, Yokkaichi (JP); Takumi Uemura, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 242 days.

(21) Appl. No.: 17/619,709

(22) PCT Filed: Jun. 3, 2020

(86) PCT No.: PCT/JP2020/021979
§ 371 (c)(1),
(2) Date: Dec. 16, 2021

(87) PCT Pub. No.: WO2020/255720
PCT Pub. Date: Dec. 24, 2020

(65) Prior Publication Data
US 2022/0360180 A1   Nov. 10, 2022

(30) Foreign Application Priority Data

Jun. 18, 2019  (JP) .................................. 2019-112480
Mar. 11, 2020  (JP) .................................. 2020-041443

(51) Int. Cl.
*H02M 3/335*   (2006.01)
*H02M 1/00*    (2006.01)
*H02M 1/32*    (2007.01)

(52) U.S. Cl.
CPC ..... *H02M 3/33573* (2021.05); *H02M 1/0009* (2021.05); *H02M 1/32* (2013.01)

(58) Field of Classification Search
CPC .... H02M 3/28; H02M 3/335; H02M 3/33573; H02M 1/0009; H02M 1/32
See application file for complete search history.

(56) References Cited

U.S. PATENT DOCUMENTS 10,008,945 B2   6/2018  Satoh
10,819,244 B1 * 10/2020  Shi .................... H02M 3/33573
(Continued)

FOREIGN PATENT DOCUMENTS

JP   2004-140913 A   5/2004
JP   2013-132112 A   7/2013
(Continued)

OTHER PUBLICATIONS

International Search Report, Application No. PCT/JP2020/021979, dated Aug. 18, 2020. ISA/Japan Patent Office.

*Primary Examiner* — Adolf D Berhane
(74) *Attorney, Agent, or Firm* — Honigman LLP

(57) ABSTRACT

An isolated DC-DC converter includes a transformer, a full-bridge switching circuit, a protective circuit, a control unit, an inductor, and an output circuit. The isolated DC-DC converter includes a first voltage detection unit that detects a voltage value between a first conductive path and a second conductive path, and a first current detection unit that detects a current value of the inductor. The control unit determines at least one of a first dead time and a second dead time on the basis of the voltage value detected by the first voltage detection unit and the current value detected by the first current detection unit, using a method that increases the dead time as the voltage value increases and reduces the dead time as the current value increases.

9 Claims, 8 Drawing Sheets

(56) References Cited

U.S. PATENT DOCUMENTS

| | | | |
|---|---|---|---|
| 11,502,620 B2 * | 11/2022 | Ujimaru | ............... H02M 7/493 |
| 2008/0170418 A1 | 7/2008 | Nishiyama et al. | |
| 2014/0028092 A1 | 1/2014 | Takeshima et al. | |
| 2017/0317599 A1 | 11/2017 | Satoh | |

FOREIGN PATENT DOCUMENTS

| | | |
|---|---|---|
| JP | 2017-017864 A | 1/2017 |
| JP | 2019-009848 A | 1/2019 |
| WO | 2015-079573 A1 | 6/2015 |

* cited by examiner

ISOLATED DC-DC CONVERTER

CROSS-REFERENCE TO RELATED APPLICATIONS

This application is the U.S. national stage of PCT/JP2020/021979 filed on Jun. 3, 2020, which claims priority of Japanese Patent Application No. JP2019-112480 filed on Jun. 18, 2019 and Japanese Patent Application No. JP2020-041443 filed on Mar. 11, 2020, the contents of which are incorporated herein.

TECHNICAL FIELD

The present disclosure relates to an isolated DC-DC converter.

BACKGROUND

An isolated DC-DC converter must adapt to wide input voltage and output load ranges while maintaining high efficiency. As a method for achieving high efficiency, a method is known in which a converter is provided with a full bridge circuit on the primary side of a transformer and a rectifier circuit on the secondary side thereof, and, after reducing a drain-source voltage of a switch element to 0 V during a dead time period of the full bridge circuit, the next switch element is turned on (soft switching). JP2004-140913A, JP2016-111805A and JP2013-132112A are examples of related art.

The timing at which the voltage across the terminals of a switching element is lowest can vary according to the current flowing in an inductor for resonance, and it is therefore desirable to vary the dead time according to the current in the inductor. However, in each of the cited documents, no attempt is made to dynamically determine the dead time according to the current flowing in the inductor for resonance.

The present disclosure provides an isolated DC-DC converter that more easily achieves high efficiency.

SUMMARY

An isolated DC-DC converter according to one aspect of the present disclosure is an isolated DC-DC converter of a phase shift type, including: a transformer including a primary-side coil and a secondary-side coil; a full-bridge switching circuit including a first switch element, a second switch element, a third switch element, and a fourth switch element; a protective circuit including a first diode and a second diode; a control unit configured to control an operation of the switching circuit; an inductor; and an output circuit connected to the secondary-side coil.

The first switch element and the second switch element are connected in series between a first conductive path and a second conductive path; the third switch element and the fourth switch element are connected in series between the first conductive path and the second conductive path; one end of the inductor is electrically connected to a first connection point between the first switch element and the second switch element; another end of the inductor is electrically connected to one end of the primary-side coil, an anode of the first diode, and a cathode of the second diode; another end of the primary-side coil is electrically connected to a second connection point between the third switch element and the fourth switch element; a cathode of the first diode is electrically connected to the first conductive path; and an anode of the second diode is electrically connected to the second conductive path.

The isolated DC-DC converter further includes: a voltage detection unit that detects a voltage value between the first conductive path and the second conductive path; and a current detection unit that detects a current value of the inductor.

The control unit determines at least one of a first dead time in which both the first switch element and the second switch element are off and a second dead time in which both the third switch element and the fourth switch element are off on the basis of the voltage value detected by the voltage detection unit and the current value detected by the current detection unit, using a method that increases the dead times as the voltage value increases and reduces the dead times as the current value increases.

Advantageous Effects of Invention

According to the present disclosure, an isolated DC-DC converter that more easily achieves high efficiency can be achieved.

DETAILED DESCRIPTION OF PREFERRED EMBODIMENTS

Figure 1:
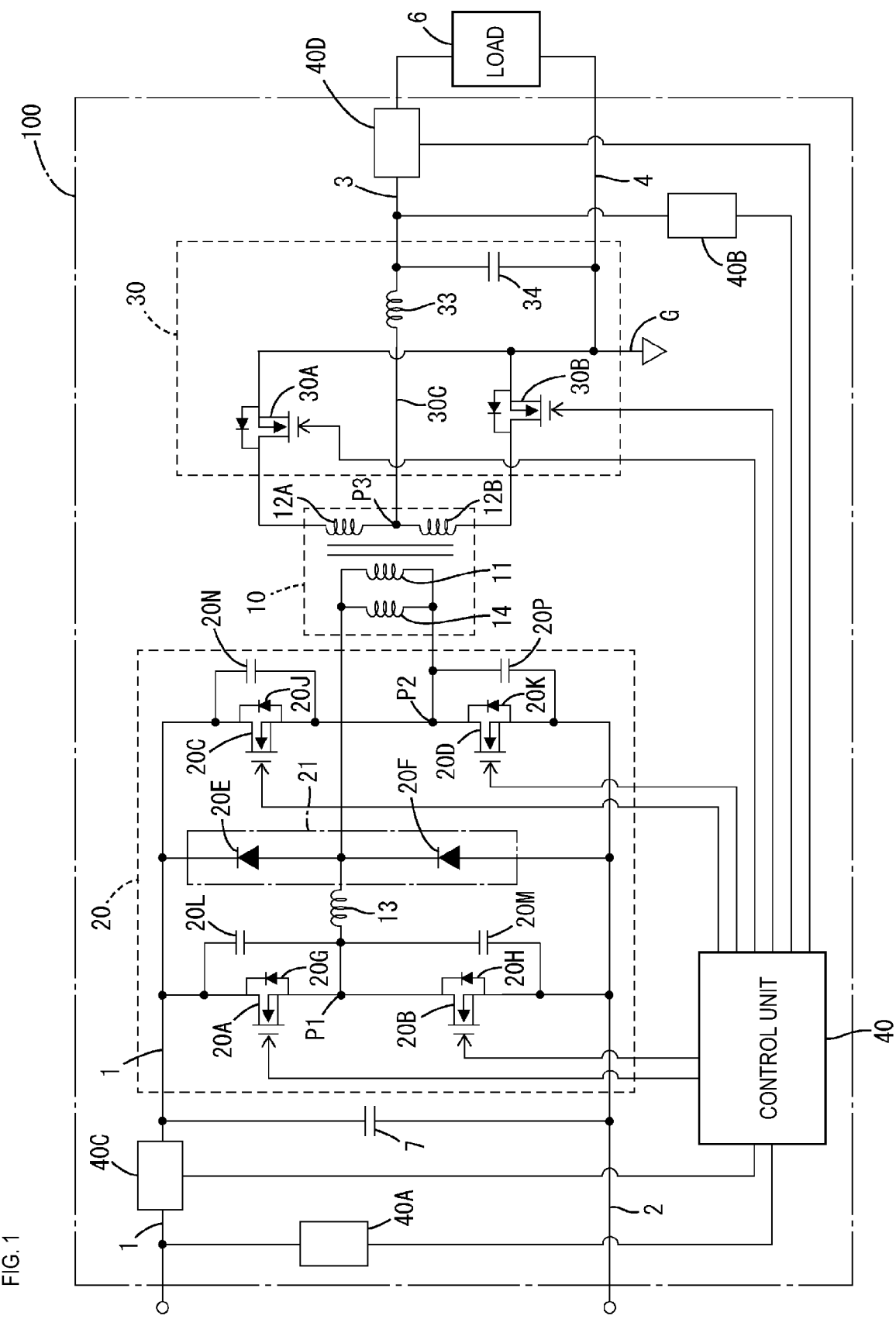
FIG. 1 is a circuit diagram illustrating an isolated DC-DC converter according to a first embodiment.

First, embodiments of the present disclosure will be described as examples.

An isolated DC-DC converter according to a first aspect of the present disclosure includes a transformer, a full-bridge switching circuit, a protective circuit, a control unit, an inductor, and an output circuit. The transformer includes a primary-side coil and a secondary-side coil. The full-bridge switching circuit includes a first switch element, a second switch element, a third switch element, and a fourth switch element. The protective circuit includes a first diode and a second diode. The control unit controls an operation of the switching circuit. The output circuit is connected to the secondary-side coil. The first switch element and the second switch element are connected in series between a first conductive path and a second conductive path. The third switch element and the fourth switch element are connected in series between the first conductive path and the second conductive path. One end of the inductor is electrically connected to a first connection point between the first switch element and the second switch element. Another end of the inductor is electrically connected to one end of the primary-side coil, an anode of the first diode, and a cathode of the second diode. Another end of the primary-side coil is electrically connected to a second connection point between the third switch element and the fourth switch element. A cathode of the first diode is electrically connected to the first conductive path. The isolated DC-DC converter of the present disclosure is a phase shift-type isolated DC-DC converter, in which an anode of the second diode is electrically connected to the second conductive path. The isolated DC-DC converter of the present disclosure includes a voltage detection unit that detects a voltage value between the first conductive path and the second conductive path, and a current detection unit that detects a current value of the inductor. The control unit determines at least one of a first dead time and a second dead time on the basis of the voltage value detected by the voltage detection unit and the current value detected by the current detection unit, using a method that increases the dead times as the voltage value increases and reduces the dead times as the current value increases.

In the isolated DC-DC converter in the first aspect, the first switch element and the second switch element both turn off in the first dead time. The third switch element and the fourth switch element both turn off in the second dead time. Accordingly, using the protective circuit, this isolated DC-DC converter can absorb recovery surge generated in the secondary-side coil of the transformer. Moreover, this isolated DC-DC converter calculates the first dead time and the second dead time on the basis of the current value of current flowing in the inductor, detected by the current detection unit. Therefore, this isolated DC-DC converter can determine the dead times dynamically on the basis of the value corresponding to the current flowing in the inductor.

In a second aspect, the isolated DC-DC converter in accordance with the first aspect, on the basis of an increasing state of the current value, the control unit determines whether or not to take into account an excitation inductance of the transformer when determining at least one of the first dead time and the second dead time.

With the isolated DC-DC converter in accordance with the second aspect, the increasing state of the current value can be viewed as the state of load current. Accordingly, the dead time can be obtained more precisely by determining whether or not the excitation inductance is to be taken into account according to the state of the load current, and then calculating the first dead time and the second dead time.

In a third aspect, the isolated DC-DC converter in accordance with the second aspect, when a rate of increase of the current value is less than or equal to a threshold, the control unit determines at least one of the first dead time and the second dead time taking into account the excitation inductance. When the rate of increase of the current value is greater than the threshold, the control unit determines at least one of the first dead time and the second dead time without taking into account the excitation inductance.

With the isolated DC-DC converter in accordance with the third aspect, if the excitation inductance is taken into account when the rate of increase of the current value is less than or equal to the threshold, the dead time will be obtained in a state where the load current is small and the magnitude of the excitation current flowing in the primary-side coil is not negligible. On the other hand, if the excitation inductance is not taken into account when the rate of increase of the current value exceeds the threshold, the dead time will be obtained in a state where the load current is large and the magnitude of the excitation current flowing in the primary-side coil is negligible. As such, a more accurate dead time can be determined by having the state of the excitation current flowing in the primary-side coil taken into account according to the magnitude of the load current.

In a fourth aspect, the isolated DC-DC converter in any of the first to third aspects, the voltage detection unit includes a secondary-side voltage measurement unit that measures a secondary-side voltage applied from the secondary-side coil of the transformer, and the voltage detection unit detects the voltage value between the first conductive path and the second conductive path on the basis of the secondary-side voltage measured by the secondary-side voltage measurement unit.

The isolated DC-DC converter in accordance with the fourth aspect can detect the voltage value between the first conductive path and the second conductive path on the basis of the secondary-side voltage measured by the secondary-side voltage measurement unit. Accordingly, this isolated DC-DC converter is advantageous in situations where it is difficult to directly measure the voltage value between the first conductive path and the second conductive path, or situations where it is more desirable to estimate the stated voltage value by measuring the secondary-side voltage rather than directly measuring the stated voltage value.

In a fifth aspect, the isolated DC-DC converter in accordance with the fourth aspect, the voltage detection unit obtains the voltage value between the first conductive path and the second conductive path on the basis of the secondary-side voltage and a turn ratio of the primary-side coil and the secondary-side coil.

The isolated DC-DC converter in accordance with the fifth aspect can more easily realize a configuration in which the voltage value between the first conductive path and the second conductive path can be more accurately obtained on the basis of the secondary-side voltage.

In accordance with a sixth aspect, the isolated DC-DC converter in any one of the fourth and fifth aspect is a step-down DC-DC converter that steps down an input voltage applied between the first conductive path and the second conductive path and outputs the output voltage.

The isolated DC-DC converter in the sixth aspect can measure the output voltage, which is relatively lower than the voltage value between the first conductive path and the second conductive path, and derive the voltage value between the first conductive path and the second conductive path from this output voltage. Accordingly, this isolated DC-DC converter can omit or simplify the configuration required for detecting a high voltage, and can achieve a more compact configuration that can detect the voltage value between the first conductive path and the second conductive path.

In the seventh aspect, the isolated DC-DC converter in any one of the fourth to the sixth aspect, the first conductive path and the second conductive path are isolated from the output circuit and the control unit, and a fourth conductive path, among a third conductive path and the fourth conductive path forming a pair that apply the output voltage in the output circuit, is electrically connected to a reference conductive path of the control unit.

First Embodiment

Overview of Isolated DC-DC Converter

An isolated DC-DC converter 100 according to a first embodiment (also called simply a "converter 100") is used as a power source that outputs power for driving electric drive devices (motors and the like) in vehicles such as hybrid automobiles or electric automobiles (electric vehicles, or "EVs"). The converter 100 transforms an input voltage Vin supplied between a first conductive path 1 and a second conductive path 2 to generate an output voltage Vout, which is applied between a third conductive path 3 and a fourth conductive path 4. As illustrated in FIG. 1, the converter 100 includes a transformer 10, a switching circuit 20 provided between the first conductive path 1 and the transformer 10, an output circuit 30 connected between the transformer 10 and the third conductive path 3, and a control unit 40 that controls the operation of the switching circuit 20. In actual use, a DC power source (not shown) is connected between the first conductive path 1 and the second conductive path 2, and a load 6 is connected between the third conductive path 3 and the fourth conductive path 4. An input capacitor 7 for stabilizing the input voltage Vin is connected between the first conductive path 1 and the second conductive path 2.

The transformer 10 includes a primary-side coil 11 and secondary-side coils 12A and 12B. The number of turns in the primary-side coil 11 is N1. The number of turns in each of the secondary-side coils 12A and 12B is N2. The secondary-side coils 12A and 12B are electrically connected in series with each other at a third connection point P3. A turn ratio N of the transformer 10 is expressed as N2/N1. An excitation inductance 14 is formed in parallel with the primary-side coil 11 in the transformer 10.

The switching circuit 20 converts the input voltage Vin, which is a DC voltage supplied to the first conductive path 1 and the second conductive path 2, into AC and supplies the converted voltage to the primary-side coil 11 of the transformer 10. The switching circuit 20 has a configuration in which a first switch element 20A, a second switch element 20B, a third switch element 20C, and a fourth switch element 20D (also called "switch elements 20A, 20B, 20C, and 20D" hereinafter) are connected in a full bridge configuration.

The switching circuit 20 includes the switch elements 20A, 20B, 20C, and 20D, a first diode 20E, a second diode 20F, and an inductor 13. Although various types of publicly-known switch elements can be used for the switch elements 20A, 20B, 20C, and 20D, it is preferable to use MOSFETs (Metal Oxide Semiconductor Field Effect Transistors).

Each of the switch elements 20A, 20B, 20C, and 20D has a configuration in which parasitic diodes 20G, 20H, 20J, and 20K, which are parasitic components, are provided. Specifically, in each of the switch elements 20A, 20B, 20C, and 20D, the configuration is such that the cathode of each of the parasitic diodes 20G, 20H, 20J, and 20K, and 20K is electrically connected to the drain side, and the anode to the source side. Note that in addition to the parasitic diodes 20G, 20H, 20J, and 20K, diodes may be added as separate elements.

Capacitors 20L, 20M, 20N, and 20P, which are capacitance components, are electrically connected in parallel to the switch elements 20A, 20B, 20C, and 20D, respectively. Specifically, one terminal of each of the capacitors 20L, 20M, 20N, and 20P is electrically connected to the drain of the switch elements 20A, 20B, 20C, and 20D, respectively, and the other terminal of each of the capacitors 20L, 20M, 20N, and 20P is electrically connected to the source of the switch elements 20A, 20B, 20C, and 20D, respectively. When MOSFETs are used for the switch elements 20A, 20B, 20C, and 20D, parasitic capacitance components are formed so that a capacitance component arises parasitically in each of the switch elements 20A, 20B, 20C, and 20D. Therefore, a configuration may also by adopted in which parasitic capacitance components are used without providing the capacitors 20L, 20M, 20N, and 20P.

The first switch element 20A and the second switch element 20B are connected in series between the first conductive path 1 and the second conductive path 2, which input an input voltage to the switching circuit 20, and are electrically connected to each other at a first connection point P1. The third switch element 20C and the fourth switch element 20D are connected in series between the first conductive path 1 and the second conductive path 2, and are electrically connected to each other at a second connection point P2.

The cathode of the first diode 20E is electrically connected to the first conductive path 1 (the conductive path on a high potential side), and the anode terminal of the second diode 20F is electrically connected to the second conductive path 2 (the conductive path on a low potential side). The anode terminal of the first diode 20E is electrically connected to the cathode terminal of the second diode 20F. Together with the inductor 13, the first diode 20E and the second diode 20F constitute a protective circuit 21 that absorbs surge voltage generated in a fifth switch element 30A and a sixth switch element 30B on the secondary side of the transformer 10.

One end of the inductor 13 is electrically connected to the first connection point P1. The other end of the inductor 13 is electrically connected to the anode terminal of the first diode 20E, the cathode terminal of the second diode 20F, and one end of the primary-side coil 11 of the transformer 10. The second connection point P2 is electrically connected to the other end of the primary-side coil 11. The inductor 13 is provided to produce LC resonance with the capacitors 20L, 20M, 20N, and 20P, in order to reduce switching loss arising in the switching circuit 20. Preferably, the value of the inductance of the inductor 13 is sufficiently greater than leakage inductance of the transformer 10 (not shown).

The output circuit 30 generates the output voltage Vout, which is a DC voltage, by rectifying and smoothing the AC voltage arising in the secondary-side coils 12A and 12B of the transformer 10, and applies the output voltage Vout between the third conductive path 3 and the fourth conductive path 4. The output circuit 30 includes the fifth switch element 30A, the sixth switch element 30B, a rectification output path 30C, a choke coil 33, and an output capacitor 34. The fifth switch element 30A is connected between one end of the secondary-side coil 12A of the transformer 10 and a ground path G. The sixth switch element 30B is connected between one end of the secondary-side coil 12B of the transformer 10 and the ground path G. One end of the rectification output path 30C is electrically connected to the third connection point P3, where the other end of the secondary-side coil 12A is electrically connected to the other end of the secondary-side coil 12B. One end of the choke coil 33 is electrically connected to the other end of the rectification output path 30C. The other end of the choke coil 33 (i.e., the end on the side away from the third connection point P3 side) is electrically connected to the third conductive path 3, and is also electrically connected to the fourth conductive path 4 via the output capacitor 34. In other words, the choke coil 33 is interposed between the third connection point P3 and the third conductive path 3. The output capacitor 34 is electrically connected between the third conductive path 3 and the fourth conductive path 4. The fourth conductive path 4 is electrically connected to the ground path G.

Although various types of publicly-known switch elements can be used for the fifth switch element 30A and the sixth switch element 30B, it is preferable to use MOSFETs. The drain of the fifth switch element 30A is electrically connected to one end of the secondary-side coil 12A, and the source is electrically connected to the ground path G. The drain of the sixth switch element 30B is electrically connected to one end of the secondary-side coil 12B, and the source is electrically connected to the ground path G. Each of the fifth switch element 30A and the sixth switch element 30B has a configuration in which parasitic diodes, which are parasitic components, are provided. Specifically, in each of the fifth switch element 30A and the sixth switch element 30B, the configuration is such that the cathode of each of the parasitic diodes is electrically connected to the drain side, and the anode to the source side.

Of the output circuit 30 having this configuration, the fifth switch element 30A and the sixth switch element 30B constitute a rectifier circuit that rectifies the AC voltage arising in the secondary-side coils 12A and 12B of the transformer 10. The choke coil 33 and the output capacitor 34 smooth the rectified output arising in the rectification output path 30C.

The control unit 40 has, for example, a microcomputer as its main configuration, and includes a processing device such as a CPU (Central Processing Unit), memory such as ROM (Read Only Memory) and RAM (Random Access Memory), an A/D converter, and the like. The control unit 40 is configured to be able to detect a voltage value in the first conductive path 1 using a first voltage detection unit 40A. The control unit 40 is configured to be able to detect a voltage value in the third conductive path 3 using a second voltage detection unit 40B. The first voltage detection unit 40A and the second voltage detection unit 40B are configured as publicly-known voltage detection circuits. The control unit 40 is configured to be able to detect a current value in the first conductive path 1 using a first current detection unit 40C. The control unit 40 is configured to be able to detect a current value in the third conductive path 3 using a second current detection unit 40D. The first current detection unit 40C and the second current detection unit 40D are configured as publicly-known current detection circuits, such as current transformers, for example.

The control unit 40 outputs PWM signals to the respective gates of the switch elements 20A, 20B, 20C, and 20D through a phase shift method, on the basis of values input from the first voltage detection unit 40A, the second voltage detection unit 40B, the first current detection unit 40C, and the second current detection unit 40D. As a result, the switch elements 20A, 20B, 20C, and 20D perform switching operations using the phase shift method. The control unit 40 is configured to be capable of outputting switching signals with predetermined timings to the gates of each of the fifth switch element 30A and the sixth switch element 30B on the basis of values and the like input from the first voltage detection unit 40A, the second voltage detection unit 40B, the first current detection unit 40C, and the second current detection unit 40D.

Operations of Isolated DC-DC Converter

Operations of the converter 100 will be described next. In a vehicle provided with the converter 100, for example, an ignition switch is switched from an off state to an on state. Upon doing so, PWM signals are output from the control unit 40 to each of the switch elements 20A, 20B, 20C, and 20D, and switching signals with predetermined timings are output to each of the fifth switch element 30A and the sixth switch element 30B.

Figure 2:
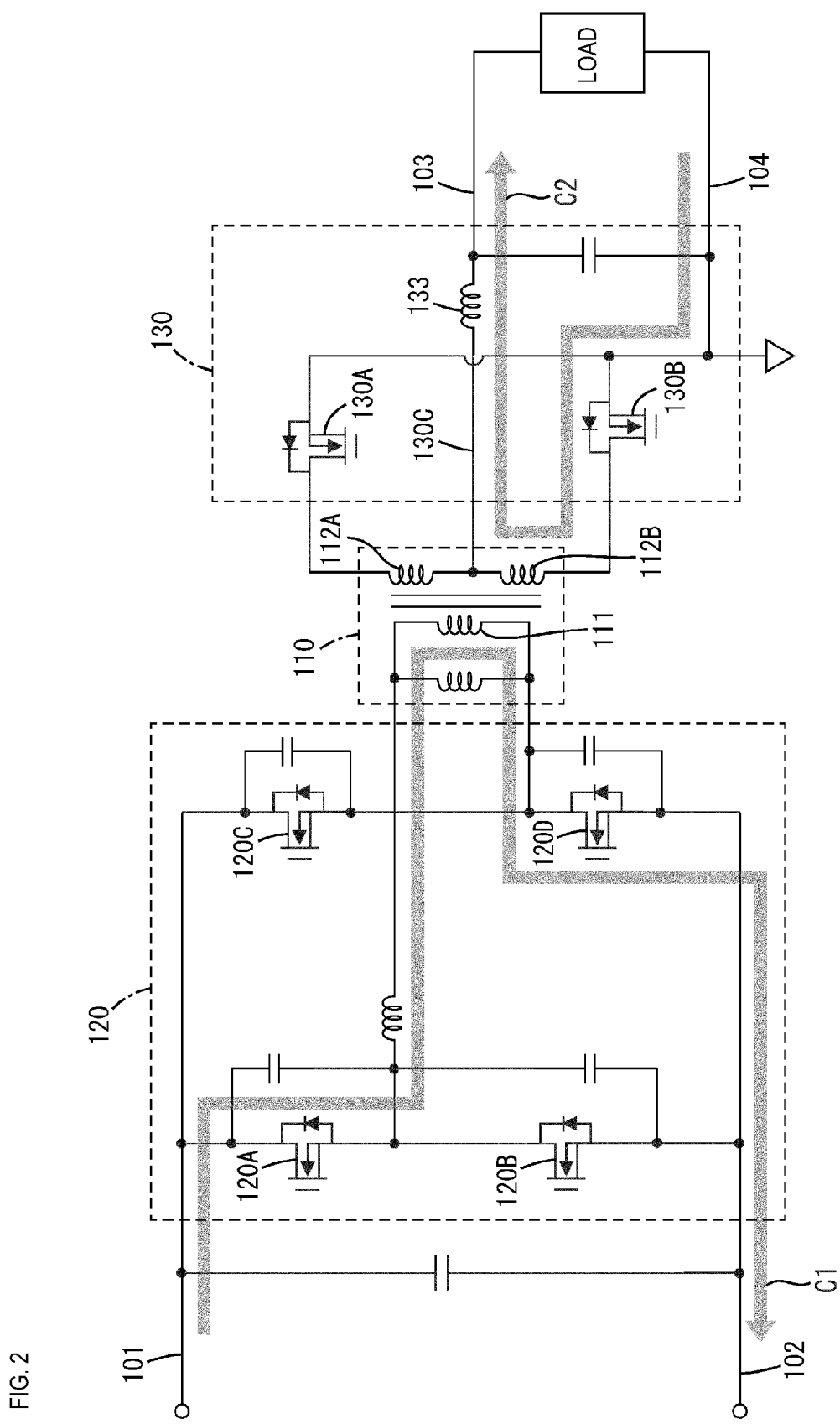
FIG. 2 is a circuit diagram illustrating a path of current flowing through a primary side and a secondary side of a transformer when a first switch element and a fourth switch element are on, in a basic isolated DC-DC converter.
Figure 3:
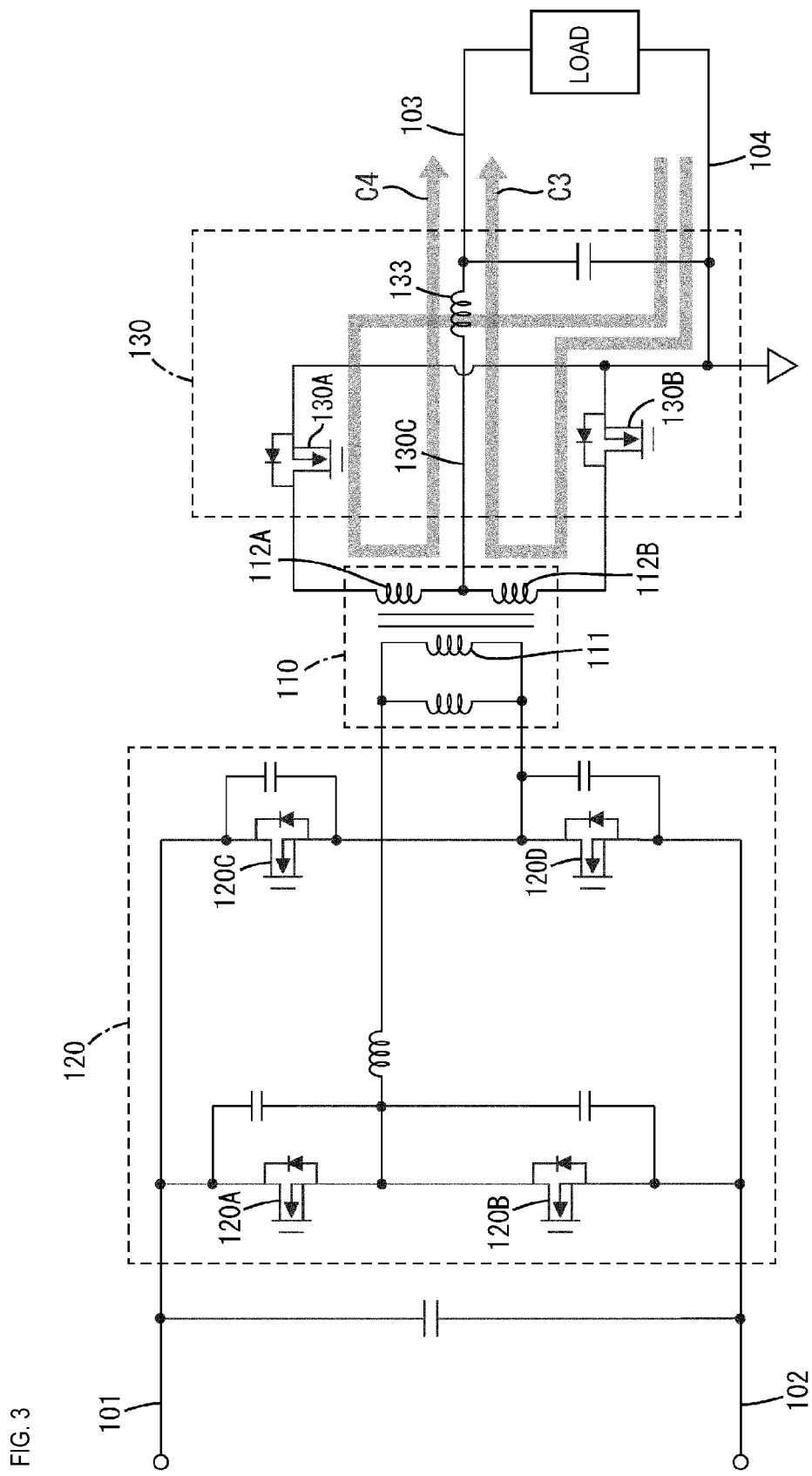
FIG. 3 is a circuit diagram illustrating a path of current flowing through the primary side and the secondary side of the transformer when the first switch element, a second switch element, a third switch element, and the fourth switch element are off, in the basic isolated DC-DC converter.
Figure 4:
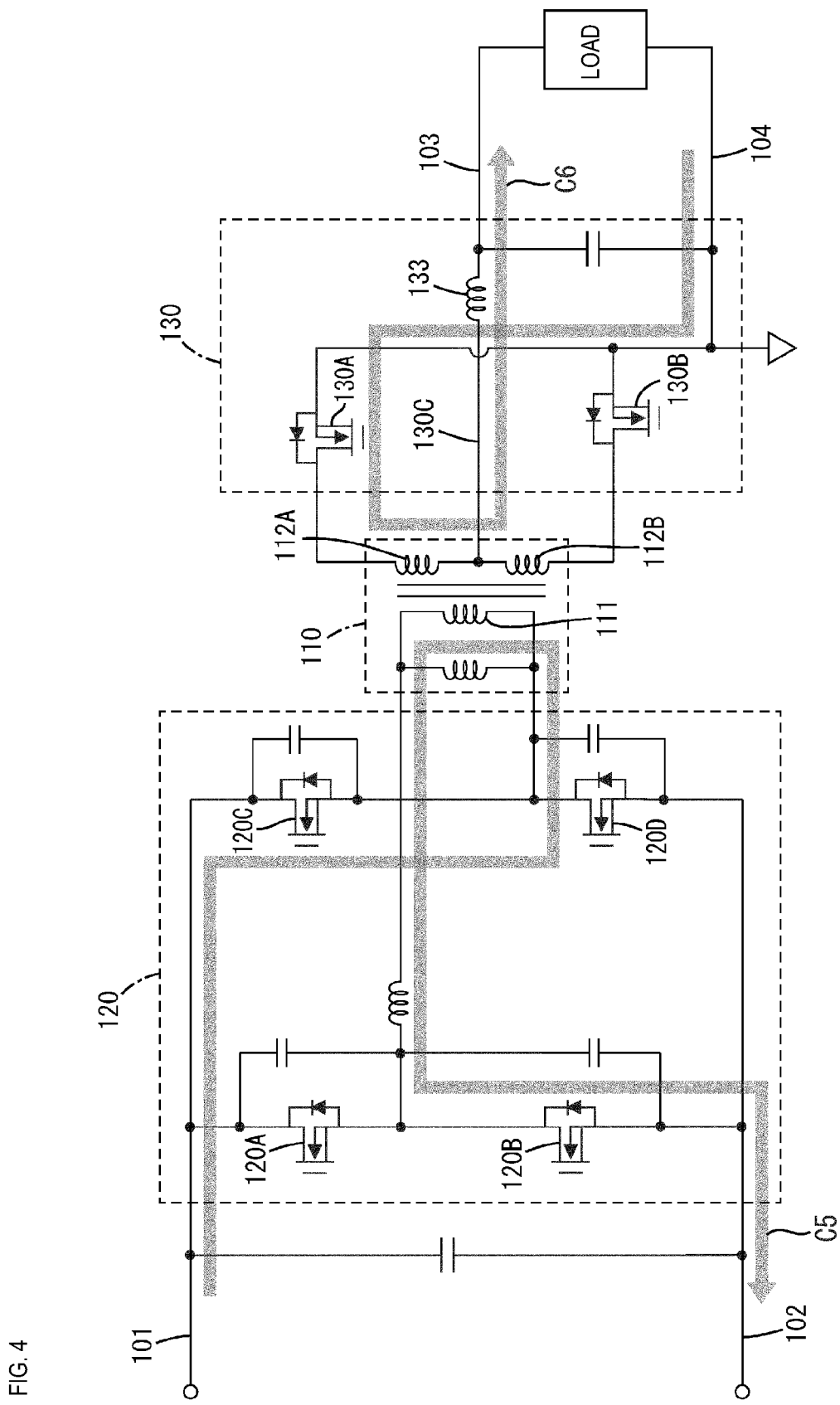
FIG. 4 is a circuit diagram illustrating a path of current flowing through a primary side and a secondary side of a transformer when the second switch element and the third switch element are on, in the basic isolated DC-DC converter.

Basically, an isolated DC-DC converter having a full bridge-connected switching circuit has a first switch element 120A and a fourth switch element 120D of a switching circuit 120, and a second switch element 120B and a third switch element 120C of the switching circuit 120, repeatedly turn on and off in an alternating manner, as illustrated in FIG. 2 to FIG. 4. Accordingly, the switching circuit 120 operates to apply an AC voltage, from the DC power source, to a primary-side coil 111 of a transformer 110, which generates an output voltage on an output circuit 130 side. Specifically, when the first switch element 120A and the fourth switch element 120D turn on, current flows toward the switching circuit 120 (the primary side of the transformer 110) along the path indicated by arrow C1. The path indicated by arrow C1 is the following path: first conductive path 101→first switch element 120A→primary-side coil 111→fourth switch element 120D→second conductive path 102. Correspondingly, current flows toward the output circuit 130 (the secondary side of the transformer 110) along the path indicated by arrow C2. The path indicated by arrow C2 is the following path: fourth conductive path 104→sixth switch element 130B→secondary-side coil 112B→rectification output path 130C→choke coil 133→third conductive path 103 (see FIG. 2).

Next, the first switch element 120A and the fourth switch element 120D switch from on to off, and the first switch element 120A, the second switch element 120B, the third switch element 120C, and the fourth switch element 120D all enter an off state. As a result, no current flows on the switching circuit 120 side (the primary side of the transformer 110). On the output circuit 130 side (the secondary side of the transformer 110), the energy stored in the choke coil 133 causes current to flow in the path indicated by arrow C3 or arrow C4. The path indicated by arrow C3 is the following path: fourth conductive path 104→sixth switch element 130B→secondary-side coil 112B→rectification output path 130C→choke coil 133→third conductive path 103. The path indicated by arrow C4 is the following path: fourth conductive path 104→fifth switch element 130A→secondary-side coil 112A→rectification output path 130C→choke coil 133→third conductive path 103 (see FIG. 3).

Next, the second switch element 120B and the third switch element 120C switch from off to on. As a result, current flows on the switching circuit 120 side (the primary side of the transformer 110) in the path indicated by arrow C5. The path indicated by arrow C5 is the following path: first conductive path 101→third switch element 120C→primary-side coil 111→second switch element 120B→second conductive path 102. Correspondingly, current flows on the output circuit 130 side (the secondary side of the transformer 110) along the path indicated by arrow C6. The path indicated by arrow C6 is the following path: fourth conductive path 104→fifth switch element 130A→secondary-side coil 112A→rectification output path 130C→choke coil 133→third conductive path 103 (see FIG. 4).

Next, the second switch element 120B and the third switch element 120C switch from on to off, and the first switch element 120A, the second switch element 120B, the third switch element 120C, and the fourth switch element 120D all enter an off state. As a result, no current flows on the switching circuit 120 side (the primary side of the transformer 110). On the output circuit 130 side (the secondary side of the transformer 110), the energy stored in the choke coil 133 causes current to flow in the path indicated by arrow C3 or arrow C4. The path indicated by arrow C3 is the following path: fourth conductive path 104→sixth switch element 130B→secondary-side coil 112B→rectification output path 130C→choke coil 133→third conductive path 103. The path indicated by arrow C4 is the following path: fourth conductive path 104→fifth switch element 130A→secondary-side coil 112A→rectification output path 130C→choke coil 133→third conductive path 103 (see FIG. 3).

Figure 5:
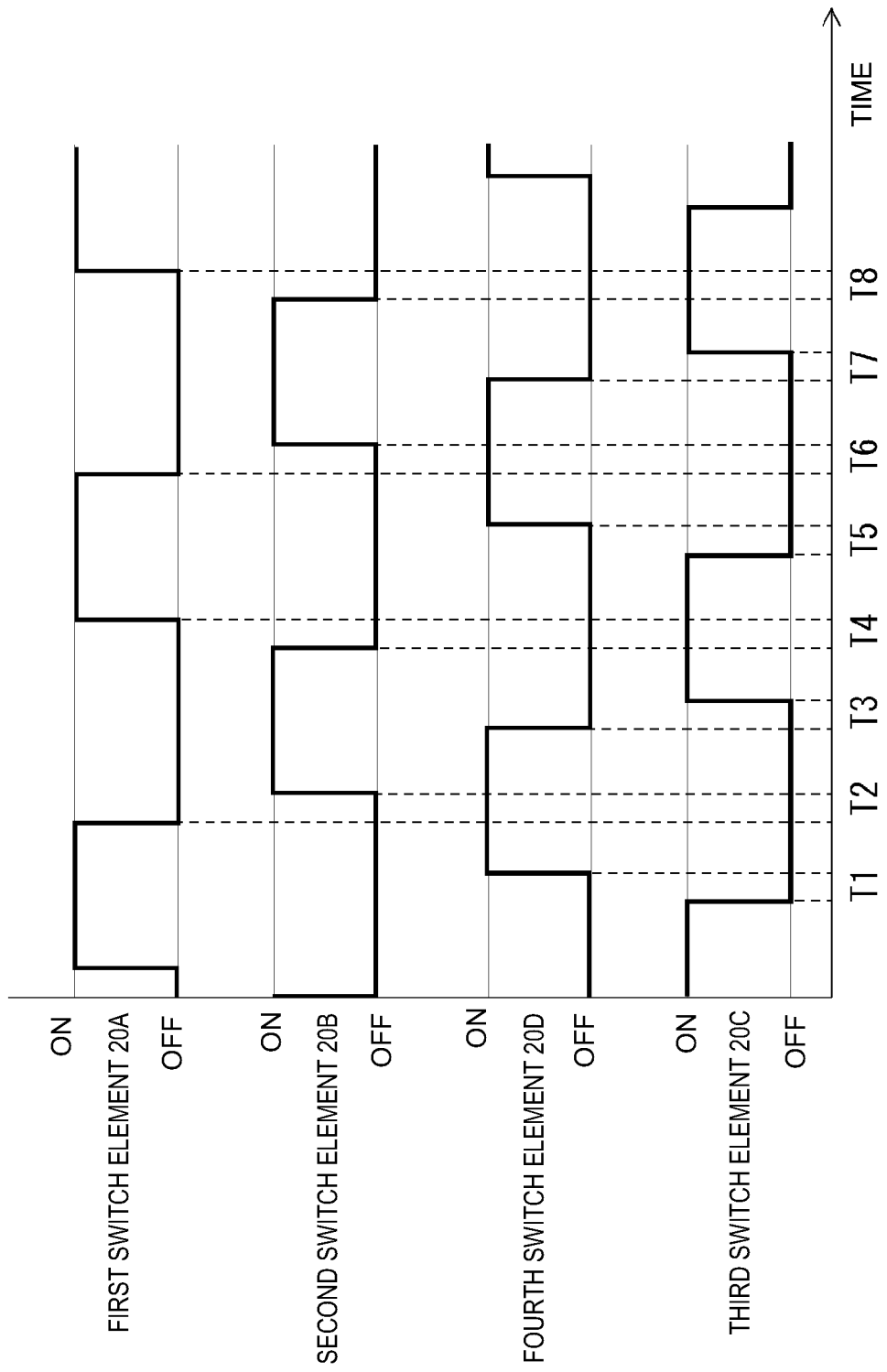
FIG. 5 is a timing chart illustrating the timings at which the first switch element, the second switch element, the third switch element, and the fourth switch element are switched on and off, in the isolated DC-DC converter according to the first embodiment.

In contrast, the converter 100 of the present disclosure performs switching operations using a phase shift method. The phase shift method is a method of controlling the first switch element 20A and the fourth switch element 20D to shift the timings of each other's on/off operations, the second switch element 20B and the third switch element 20C to shift the timings of each other's on/off operations, and the switch elements 20A, 20B, 20C, and 20D to shift the timings of one another's on/off operations, as illustrated in FIG. 5. This realizes ZVS (Zero Voltage Switching) when the switch elements 20A, 20B, 20C, and 20D switch from off to on, and enables the converter 100 to operate with higher efficiency. In the phase shift method, the first switch element 20A and the second switch element 20B are treated as one set (also called a "first leg" hereinafter), and the third switch element 20C and the fourth switch element 20D are treated as one set (also called a "second leg" hereinafter). In the first leg, the time when the first switch element 20A and the second switch element 20B are both turned off (T2, T4, T6, and T8 in FIG. 5) is a first dead time. In the second leg, the time when the third switch element 20C and the fourth switch element 20D are both turned off (T1, T3, T5, and T7 in FIG. 5) is a second dead time.

Figure 6:
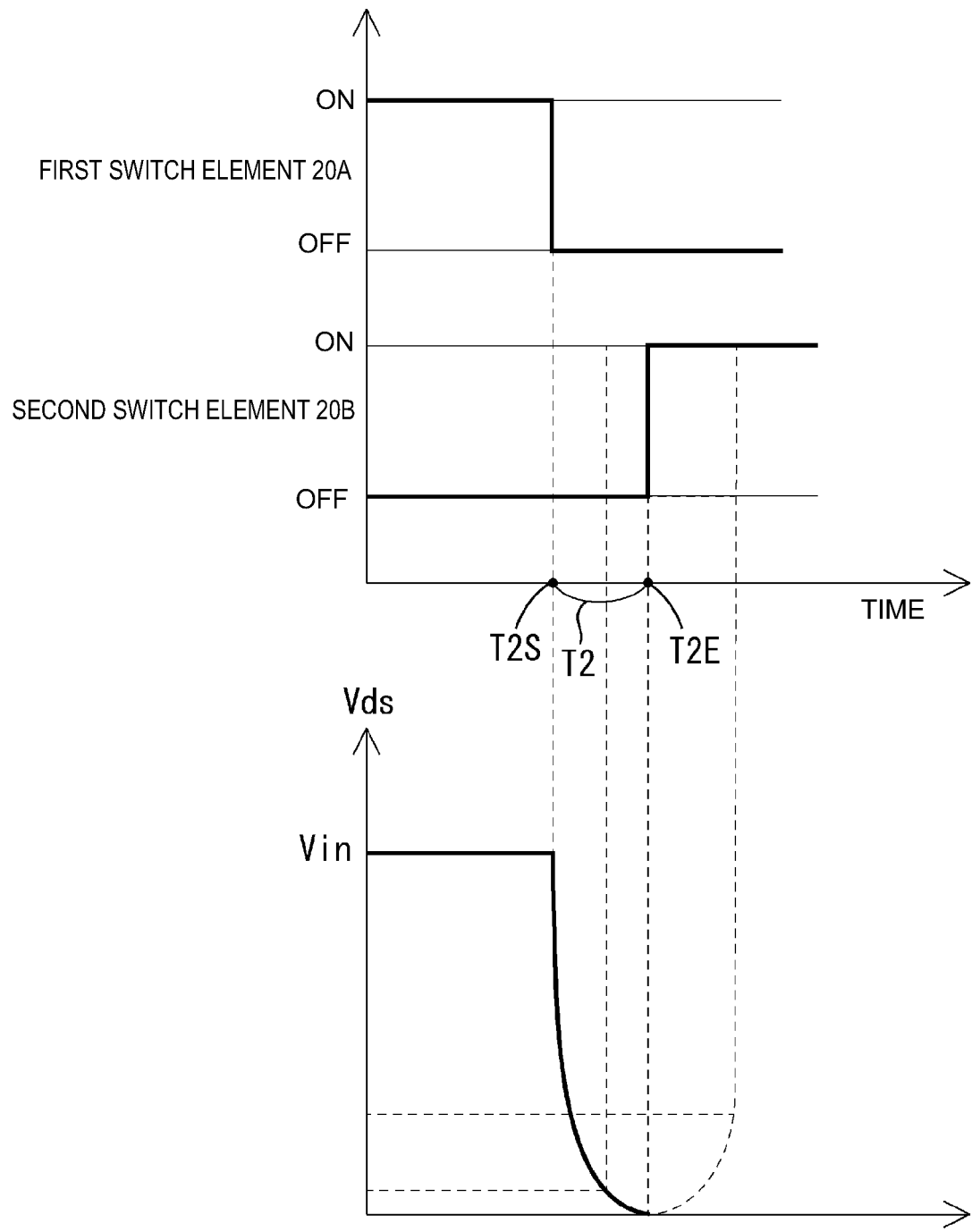
FIG. 6 is, in the upper part, an enlarged view of the timing chart for the first switch element and the second switch element at time T2 in FIG. 5, and in the lower part, a graph showing changes in a voltage applied between a drain and a source of the second switch element at time T2.

Here, a case where the second switch element 20B switches from off to on in the first dead time will be described, focusing on time T2. As illustrated in FIG. 6, prior to time T2S (i.e., the first switch element 20A is on), the DC input voltage Vin is applied between the drain and the source of the second switch element 20B (see the lower part of FIG. 6). At this time, the DC input voltage Vin is also applied to the capacitor 20M connected in parallel with the second switch element 20B. Then, at time T2S, when the first switch element 20A switches from on to off, no current flows in the first switch element 20A. At this time, LC resonance starts between the capacitor 20M connected in parallel with the second switch element 20B and the inductor 13, and the voltage between the drain and the source of the second switch element 20B approaches half the magnitude of the DC input voltage Vin. The voltage between the drain and the source of the second switch element 20B is closest to 0 V at time T2E, when the voltage first drops after the LC resonance starts (see the lower part of FIG. 6). Therefore, by setting T2E as the time to switch the second switch element 20B from off to on, ZVS can be realized in the second switch element 20B. Note that the time at which the second switch element 20B switches from off to on may be a time slightly earlier than T2E.

Although a case where the second switch element 20B switches from off to on in the first dead time has been described with a focus on time T2, the same applies to the other times T1, T3, T4, T5, T6, T7, and T8 indicated in FIG. 5 and cases where the other switch elements 20A, 20C, and 20D switch from off to on.

Here, the first dead time (tdead_a) in the first leg can be obtained by the formula indicated in Math 1.

$$\text{tdead\_a} = \frac{1}{\omega a} \cdot \tan^{-1} \cdot \left( \frac{(Vin - N \times Vout)}{IL} \times \sqrt{\frac{(Ca1 + Ca2)}{(L + N^2 \times L_{choke})}} \right) \quad \text{Math 1}$$

$$\omega a = \frac{1}{\sqrt{(L + N^2 \times L_{choke}) \times (Ca1 + Ca2)}}$$

Likewise, the second dead time (tdead_b) in the second leg can be obtained by the formula indicated in Math 2.

$$\text{tdead\_b} = \frac{1}{\omega b} \cdot \sin^{-1} \cdot \left( \frac{Vin}{IL} \sqrt{\frac{(Cb1 + Cb2)}{L}} \right) \quad \text{Math 2}$$

$$\omega b = \frac{1}{\sqrt{L \times (Cb1 + Cb2)}}$$

Here, Vin represents the input voltage from the DC power source. N represents the turn ratio of the number of turns N1 of the primary-side coil 11 to the number of turns N2 of the secondary-side coil 12A or 12B. Vout represents the voltage applied between the third conductive path 3 and the fourth conductive path 4. IL represents the current flowing in the inductor 13. Ca1 represents the electrostatic capacitance of the capacitor 20L. Ca1 represents the electrostatic capacitance of the capacitor 20M. Cb1 represents the electrostatic capacitance of the capacitor 20N. Cb1 represents the electrostatic capacitance of the capacitor 20P. L represents the inductance of the inductor 13. Lchoke represents the inductance of the choke coil 33.

The right sides of tdead_a and tdead_b in the equations shown in Math 1 and Math 2, respectively, are the amounts of time from the time when one switch element switches off and both switch elements are off, to the time when the voltage between the drain and source of the other switch element first becomes the lowest due to LC resonance, in the first leg and the second leg. In other words, these times are set as the first dead time (tdead_a) and the second dead time (tdead_b).

The control unit 40 detects Vin using the first voltage detection unit 40A and Vout using the second voltage detection unit 40B. IL is detected using the first current detection unit 40C. Accordingly, the control unit 40 can obtain Vin, IL, and Vout and calculate the first dead time (tdead_a) and the second dead time (tdead_b) dynamically by calculating the dead times on the basis of the formulas indicated in Math 1 and Math 2. Then, PWM signals are output to each of the switch elements 20A, 20B, 20C, and 20D to achieve the calculated first dead time (tdead_a) and second dead time (tdead_b). This enables ZVS to be realized in the switch elements 20A, 20B, 20C, and 20D.

According to the formula indicated in Math 1 and the formula indicated in Math 2, the dead time increases as the value of the input voltage Vin from the DC power source (i.e., the voltage value detected by the first voltage detection unit 40A) increases, and the dead time decreases as the value of the current IL flowing in the inductor 13 (i.e., the current value detected by the first current detection unit 40C) increases. Additionally, the dead time increases as the value of the output voltage Vout applied between the third conductive path 3 and the fourth conductive path 4 (i.e., the voltage value detected by the second voltage detection unit 40B) increases.

Figure 7:
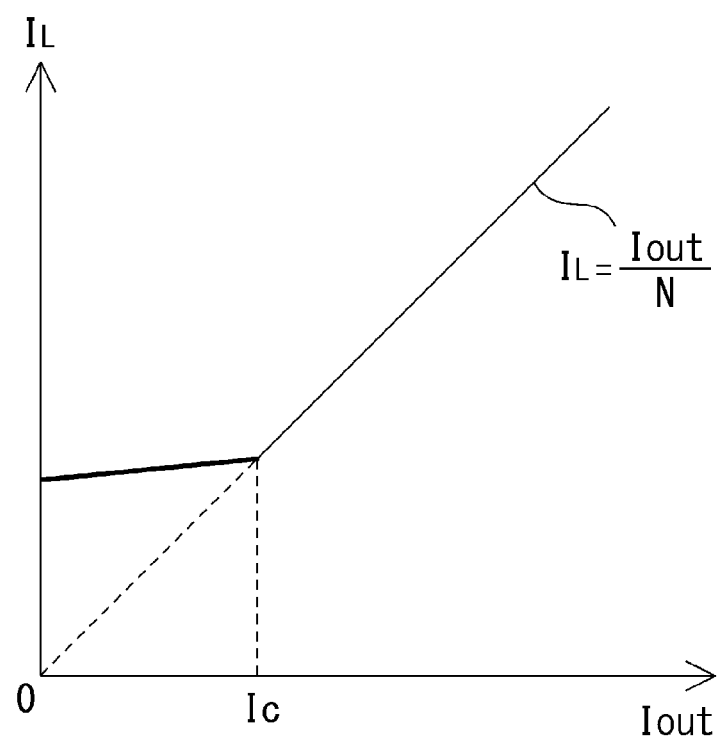
FIG. 7 is a graph showing a relationship between current IL flowing in an inductor and current Iout flowing in a choke coil.

A case where the current in the choke coil 33 is in a discontinuous mode will be described next. There is a relationship between the current IL flowing in the inductor 13 and current Iout flowing in the load 6 (i.e., the current flowing in the choke coil 33), as indicated by the graph in FIG. 7. In FIG. 7, when Iout is greater than Ic, the current in the choke coil 33 is in a continuous mode, whereas when Iout is less than Ic, the current in the choke coil 33 is in a discontinuous mode. When the magnitude of the current Iout is greater than Ic (i.e., in the continuous mode), a directly-proportional relationship is established between Iout and IL, expressed as IL=Iout/N. N represents the turn ratio of the number of turns N1 of the primary-side coil 11 to the number of turns N2 of the secondary-side coil 12A or 12B. In the continuous mode, the first dead time (tdead_a) and the second dead time (tdead_b) are calculated dynamically by calculating the dead times on the basis of the formulas indicated in Math 1 and Math 2.

On the other hand, if excitation current is transferred from the secondary-side coils 12A and 12B to the primary-side coil 11 and flows therethrough, the dead time may be calculated using an arithmetic formula different from the formula in Math 1 or Math 2. The excitation current has a property of flowing through the secondary-side coils 12A and 12B when the load current is relatively large, and through the primary-side coil 11 when the load current is relatively small. Therefore, when the magnitude of Iout is less than or equal to Ic, a directly-proportional relationship having a smaller slope than the straight line represented by IL=Iout/N (i.e., less than 1/N) is established. This is a result of the fact that the excitation current flowing in the primary-side coil 11 increases when the magnitude of Tout is less than or equal to Ic, and also reflects the fact that the excitation current flowing in the primary-side coil 11 increases as Tout approaches 0. Accordingly, a rate of increase (i.e., the slope) of the current in the section where the magnitude of Tout is between 0 and Ic is lower than the rate of increase (i.e., the slope) in the section where the magnitude of Tout is greater than Ic. The rate of increase in the section where the magnitude of Tout is between 0 and Ic is lower than the rate of increase in the section where the magnitude of Tout is greater than Ic (i.e., the slope of 1/N) because the excitation current is reflected in the current IL flowing in the inductor 13. A method is conceivable in which Ic is detected, for example, by comparing the rates of increase with a predetermined threshold stored in the control unit 40 in advance as a configuration that monitors the rate of increase of Tout or IL in the control unit 40.

Here, when the excitation current flows in the primary-side coil 11 (i.e., the section in FIG. 7 where the magnitude of Tout is 0 to Ic), the first dead time (tdead_a) in the first leg can be obtained by the formula indicated in Math 3.

Math 3

$$tdead\_a = \frac{1}{\omega a} \cdot \tan^{-1} \cdot \left( \frac{(Vin - N \times Vout)}{IL} \times \sqrt{\frac{(Ca1 + Ca2)}{(L + Lmag + N^2 \times L_{choke})}} \right)$$

$$\omega a = \frac{1}{\sqrt{(L + Lmag + N^2 \times L_{choke}) \times (Ca1 + Ca2)}}$$

Likewise, when the current flowing in the choke coil 33 is in the discontinuous mode, the second dead time (tdead_b) in the second leg can be obtained by the formula indicated in Math 4.

Math 4

$$tdead\_b = \frac{1}{\omega b} \cdot \sin^{-1} \cdot \left( \frac{Vin}{IL} \sqrt{\frac{(Cb1 + Cb2)}{(L + Lmag)}} \right)$$

$$\omega b = \frac{1}{\sqrt{(L + Lmag) \times (Cb1 + Cb2)}}$$

Here, Lmag is the value of the excitation inductance 14. The right sides of tdead_a and tdead_b in the equations shown in Math 3 and Math 4, respectively, are the amounts of time from the time when one switch element switches off and both switch elements are off, to the time when the voltage between the drain and source of the other switch element first becomes the lowest due to LC resonance, in the first leg and the second leg. In other words, these times are set as the first dead time (tdead_a) and the second dead time (tdead_b) in the discontinuous mode.

Therefore, when the current flowing in the choke coil 33 is in the discontinuous mode (i.e., is less than or equal to Ic), the control unit 40 can dynamically calculate the first dead time (tdead_a) and the second dead time (tdead_b) taking into account the value of the excitation inductance 14 by calculating the dead times on the basis of the formulas indicated in Math 3 and Math 4. Then, PWM signals are output to each of the switch elements 20A, 20B, 20C, and 20D to achieve the calculated first dead time (tdead_a) and second dead time (tdead_b). This enables ZVS to be realized in the switch elements 20A, 20B, 20C, and 20D even when excitation current flows in the primary-side coil 11. In other words, on the basis of the increasing state of the current Iout flowing in the choke coil 33 (i.e., the current IL flowing in the inductor 13), the control unit 40 determines whether or not the excitation inductance 14 of the transformer 10 is to be taken into account when determining the first dead time and the second dead time.

According to the formula indicated in Math 3 and the formula indicated in Math 4, the dead time increases as the value of the input voltage Vin from the DC power source (i.e., the voltage value detected by the first voltage detection unit 40A) increases, and the dead time decreases as the value of the current IL flowing in the inductor 13 (i.e., the current value detected by the first current detection unit 40C) increases. Additionally, the dead time increases as the value of the output voltage Vout applied between the third conductive path 3 and the fourth conductive path 4 (i.e., the voltage value detected by the second voltage detection unit 40B) increases.

Examples of the effects of this configuration will be given next.

The isolated DC-DC converter 100 of the present disclosure includes the transformer 10, the full-bridge switching circuit 20, the protective circuit 21, the control unit 40, the inductor 13, and the output circuit 30. The transformer 10 includes the primary-side coil 11 and the secondary-side coils 12A and 12B. The full-bridge switching circuit 20 includes the switch elements 20A, 20B, 20C, and 20D. The protective circuit 21 includes the first diode 20E and the second diode 20F. The control unit 40 controls the operations of the switching circuit 20. The output circuit 30 is connected to the secondary-side coils 12A and 12B. The first switch element 20A and the second switch element 20B are connected in series between the first conductive path 1 and the second conductive path 2. The third switch element 20C and the fourth switch element 20D are connected in series between the first conductive path 1 and the second conductive path 2. One end of the inductor 13 is electrically connected to the first connection point P1 between the first switch element 20A and the second switch element 20B. The other end of the inductor 13 is electrically connected to one end of the primary-side coil 11, the anode of the first diode 20E, and the cathode of the second diode 20F. The other end of the primary-side coil 11 is electrically connected to the second connection point P2 between the third switch element 20C and the fourth switch element 20D. The cathode of the first diode 20E is electrically connected to the first conductive path 1. The isolated DC-DC converter 100 of the present disclosure is a phase shift-type isolated DC-DC converter, in which the anode of the second diode 20F is electrically connected to the second conductive path 2. The isolated DC-DC converter 100 of the present disclosure includes the first voltage detection unit 40A that detects a voltage value between the first conductive path 1 and the second conductive path 2, and the first current detection unit 40C that detects a current value in the inductor 13. The control unit 40 determines at least one of the first dead time and the second dead time on the basis of the voltage value detected by the first voltage detection unit 40A and the current value detected by the first current detection unit 40C, using a method that increases the dead time as the voltage value increases and reduces the dead time as the current value increases. In the first dead time, the first switch element 20A and the second switch element 20B both turn off. In the second dead time, the third switch element 20C and the fourth switch element 20D both turn off.

Accordingly, using the protective circuit 21, this isolated DC-DC converter 100 can absorb recovery surge generated on the secondary side of the transformer 10. Moreover, this isolated DC-DC converter 100 calculates the first dead time and the second dead time on the basis of the current value of the current IL flowing in the inductor 13, detected by the first current detection unit 40C. Therefore, this isolated DC-DC converter 100 can obtain the dead times dynamically on the basis of the value corresponding to the current flowing in the inductor 13.

The control unit 40 of the isolated DC-DC converter 100 of the present disclosure determines whether or not the excitation inductance 14 of the transformer 10 is to be taken into account when determining the first dead time and the second dead time, on the basis of the increasing state of the current value.

With this configuration, the increasing state of the current value can be viewed as the state of the load current. Accordingly, the dead time can be obtained more precisely by determining whether or not the excitation inductance 14 is to be taken into account according to the state of the load current, and then calculating the first dead time and the second dead time.

The control unit 40 of the isolated DC-DC converter 100 of the present disclosure determines at least one of the first dead time and the second dead time by taking into account the excitation inductance 14 when the rate of increase of the current value is less than or equal to a threshold. The control unit 40 determines the first dead time and the second dead time without taking into account the excitation inductance 14 when the rate of increase of the current value exceeds the threshold.

With this configuration, if the excitation inductance 14 is taken into account when the rate of increase of the current value is less than or equal to the threshold, the dead time will be obtained in a state where the load current is small and the magnitude of the excitation current flowing in the primary-side coil 11 is not negligible. On the other hand, if the excitation inductance 14 is not taken into account when the rate of increase of the current value exceeds the threshold, the dead time will be obtained in a state where the load current is large and the magnitude of the excitation current flowing in the primary-side coil 11 is negligible. As such, a more accurate dead time can be obtained by having the state of the excitation current flowing in the primary-side coil taken into account according to the magnitude of the load current.

Second Embodiment

Figure 8:
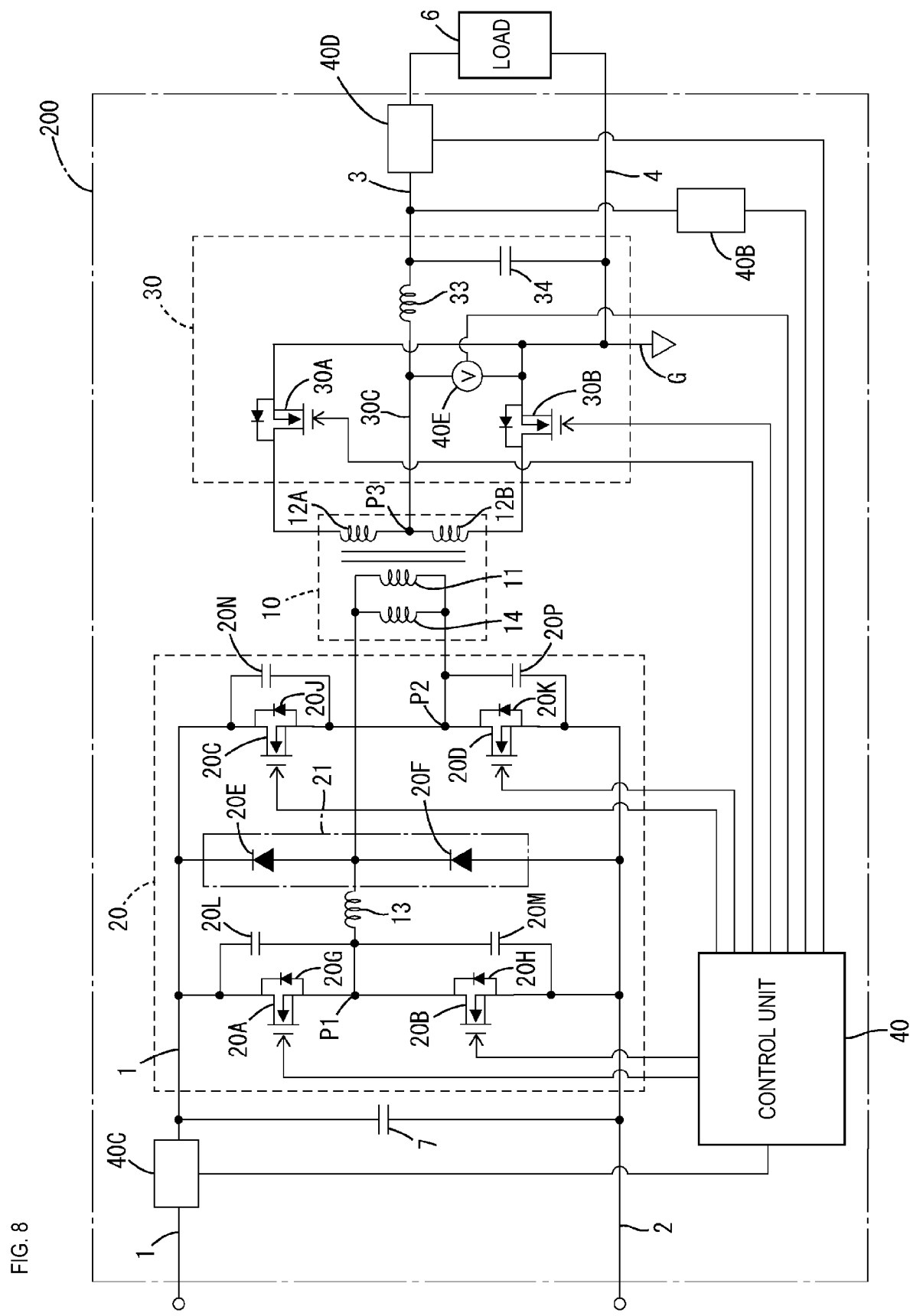
FIG. 8 is a circuit diagram illustrating an isolated DC-DC converter according to a second embodiment.

The following descriptions pertain to an isolated DC-DC converter 200 of a second embodiment, illustrated in FIG. 8.

The isolated DC-DC converter 200 of the second embodiment differs from the isolated DC-DC converter 100 of the first embodiment in that the first voltage detection unit 40A is omitted (a first difference). Furthermore, the isolated DC-DC converter 200 of the second embodiment differs from the isolated DC-DC converter 100 of the first embodiment in that a secondary-side voltage detection unit 40E is provided (a second difference). Further still, the isolated DC-DC converter 200 of the second embodiment differs from the isolated DC-DC converter 100 of the first embodiment in that "the voltage value between the first conductive path 1 and the second conductive path 2" is detected through a method different from that of the first embodiment (a third difference). However, aside from the first difference, the second difference, and the third difference, all configurations, operations, and the like of the isolated DC-DC converter 200 of the second embodiment are the same as those of the isolated DC-DC converter 100 of the first embodiment.

The isolated DC-DC converter 200 of the second embodiment is also a step-down DC-DC converter that steps down the input voltage Vin, which is a DC voltage applied between the first conductive path 1 and the second conductive path 2, and outputs the output voltage Vout, which is a DC voltage lower than the input voltage Vin.

In the isolated DC-DC converter 200, the secondary-side voltage detection unit 40E and the control unit 40 correspond to an example of a voltage detection unit.

The secondary-side voltage detection unit 40E measures a secondary-side voltage Vtr2 applied from the secondary-side coils 12A and 12B of the transformer 10. The secondary-side voltage Vtr2 is a potential difference between the rectification output path 30C (a fifth conductive path) electrically connected to the transformer 10 and the fourth conductive path 4 electrically connected to the ground. The rectification output path 30C is a conductive path between an intermediate position (center tap) of the secondary-side coils 12A and 12B in the transformer 10 and the choke coil 33. That is, the secondary-side voltage Vtr2 is the voltage of the rectification output path 30C (the fifth conductive path) with the potential of the fourth conductive path 4 (a ground potential) being the reference. The secondary-side voltage Vtr2 is a value that indicates the voltage across both ends of the secondary-side coils 12A and 12B, before this voltage across both ends is smoothed by a filter circuit constituted by the choke coil 33 and the output capacitor 34. Note that the value indicated by the second voltage detection unit 40B is a potential difference between the third conductive path 3 and the fourth conductive path 4, and is the value of the DC voltage after the stated voltage across both ends has been smoothed by the filter circuit. The secondary-side voltage detection unit 40E inputs a signal indicating the value of the secondary-side voltage Vtr2 to the control unit 40. The signal indicating the value of the secondary-side voltage Vtr2 can be any signal that can specify the value of the secondary-side voltage Vtr2, and may be a signal indicating the value of the secondary-side voltage Vtr2 itself, or a signal indicating a value obtained by dividing the secondary-side voltage Vtr2 by a predetermined division ratio.

The control unit 40 detects the voltage value between the first conductive path 1 and the second conductive path 2 on the basis of the secondary-side voltage Vtr2 measured by the secondary-side voltage detection unit 40E. The voltage value between the first conductive path 1 and the second conductive path 2 is the value of the input voltage Vin, and is the potential difference between the first conductive path 1 and the second conductive path 2.

The control unit 40 takes the value of the secondary-side voltage as Vtr2, takes the turn ratio of the primary-side coil 11 and the secondary-side coil 12A and the turn ratio of the primary-side coil 11 and the secondary-side coil 12B both as N, and takes the voltage value between the first conductive path 1 and the second conductive path 2 (the value of the input voltage) as Vin. The number of turns in the primary-side coil 11 is N1, and the numbers of turns in the secondary-side coils 12A and 12B are both N2. The turn ratio N is N=N1/N2. Under these assumptions, the control unit 40 obtains Vin through the formula Vin=Vtr2×N. Note that in the isolated DC-DC converter 200, the control using Vin is the same as in the first embodiment, and the other control is also the same as in the first embodiment.

In this manner, the isolated DC-DC converter 200 of the second embodiment can detect the voltage value between the first conductive path 1 and the second conductive path 2 (the value of the input voltage Vin) on the basis of the secondary-side voltage Vtr2 measured by the secondary-side voltage measurement unit. Accordingly, this isolated DC-DC converter is advantageous in situations where it is difficult to directly measure the voltage value between the first conductive path 1 and the second conductive path 2 (the value of the input voltage Vin), or situations where it is more desirable to estimate the stated voltage value by measuring the secondary-side voltage Vtr2 rather than directly measuring the stated voltage value.

The isolated DC-DC converter 200 can, on the basis of the turn ratio N, more easily realize a configuration in which the voltage value between the first conductive path 1 and the second conductive path 2 (the value of the input voltage Vin) can be more accurately obtained on the basis of the secondary-side voltage Vtr2. Note that the calculation method described above (Vin=Vtr2×N) is merely an example, and another calculation method may be used as long as the input voltage Vin can be calculated on the basis of the secondary-side voltage Vtr2 and the turn ratio of the transformer.

The isolated DC-DC converter 200 can measure the secondary-side voltage Vtr2, which is relatively lower than the voltage value between the first conductive path 1 and the second conductive path 2 (the value of the input voltage Vin), and derive the voltage value between the first conductive path 1 and the second conductive path 2 from this secondary-side voltage Vtr2. Accordingly, this isolated DC-DC converter 200 can omit or simplify the configuration required for detecting a high voltage, and can achieve a more compact configuration that can detect the voltage value between the first conductive path 1 and the second conductive path 2. For example, if the value of the input voltage Vin is measured directly and the measured value is input to the control unit 40, an isolation part such as an isolation amplifier or the like is required between the input side and the control unit 40 as the value of input voltage Vin increases, but according to the method of the second embodiment, such a component can be omitted.

In particular, in this configuration, the secondary-side coils 12A and 12B and the rectification output path 30C are isolated from both the first conductive path 1 and the second conductive path 2, and the fourth conductive path 4 is isolated from both the first conductive path 1 and the second conductive path 2. The fourth conductive path 4 is electrically connected to a reference conductive path (not shown) in the control unit 40, and the fourth conductive path 4 is at the same potential as the reference conductive path of the control unit 40. Accordingly, the measurement result of the secondary-side voltage Vtr2 can be input to the control unit 40 favorably without isolation, while at the same time, (a) the measurement path of the secondary-side voltage Vtr2 and the control unit 40 and (b) the first conductive path 1 and the second conductive path 2 on the input side can be reliably isolated from each other.

OTHER EMBODIMENTS

The present configuration is not limited to the embodiment described above with reference to the drawings, and embodiments such as the following, for example, also fall within the technical scope of the present invention.

In the first and second embodiments, the first dead time (tdead_a) and the second dead time (tdead_b) are calculated by being computed in the control unit 40. However, a data table in which first dead times and second dead times corresponding to the input voltage, the current flowing in the inductor, and the output voltage are stored may be stored in the control unit, and each switch element may be switched from off to on on the basis of the first dead time and the second dead time, calculated from the data table, corresponding to the input voltage, the current flowing in the inductor, and the output voltage.

In the first and second embodiments, MOSFETs are used for the fifth switch element 30A and the sixth switch element 30B, but a configuration in which diodes are used is also possible.

In the first and second embodiments, the control unit 40 is mainly constituted by a microcomputer, but the control unit 40 may be realized by multiple hardware circuits other than a microcomputer.

In the first and second embodiments, both the first dead time and the second dead time are obtained, but it is acceptable for at least one of the first dead time or the second dead time to be obtained.

In the first embodiment, the voltage value of the input voltage Vin is detected by the first voltage detection unit 40A, but the input voltage Vin may be calculated by computing the input voltage Vin from the voltage value of the output voltage Vout detected by the second voltage detection unit, the turn ratio of the transformer, and a duty cycle of the PWM signals. Alternatively, in the configuration of the first embodiment, the value of the input voltage Vin may be detected as in the second embodiment.

In the first and second embodiments, the current IL flowing in the inductor 13 is detected by the first current detection unit 40C provided in the first conductive path 1, but the position and configuration of the current detection unit may be any position and configuration that enable the current flowing in the inductor to be detected.

The embodiments disclosed here are intended to be in all ways exemplary and in no ways limiting. The scope of the present invention is not intended to be limited to the embodiments disclosed here, and is defined instead by the scope of the appended claims. All changes that fall within the same essential spirit and scope as the scope of the claims are intended to be included therein as well.

The invention claimed is:

1. An isolated DC-DC converter of a phase shift type, comprising:
   a transformer including a primary-side coil and a secondary-side coil;
   a full-bridge switching circuit including a first switch element, a second switch element, a third switch element, and a fourth switch element;
   a protective circuit including a first diode and a second diode;
   a control unit configured to control an operation of the switching circuit;
   an inductor; and
   an output circuit connected to the secondary-side coil,
   wherein the first switch element and the second switch element are connected in series between a first conductive path and a second conductive path,
   the third switch element and the fourth switch element are connected in series between the first conductive path and the second conductive path,
   one end of the inductor is electrically connected to a first connection point between the first switch element and the second switch element,
   another end of the inductor is electrically connected to one end of the primary-side coil, an anode of the first diode, and a cathode of the second diode,
   another end of the primary-side coil is electrically connected to a second connection point between the third switch element and the fourth switch element,
   a cathode of the first diode is electrically connected to the first conductive path, and
   an anode of the second diode is electrically connected to the second conductive path,
   the isolated DC-DC converter further comprising:
   a voltage detection unit that detects a voltage value between the first conductive path and the second conductive path; and
   a current detection unit that detects a current value of the inductor,
   wherein the control unit determines at least one of a first dead time in which both the first switch element and the second switch element are off and a second dead time in which both the third switch element and the fourth switch element are off on the basis of the voltage value detected by the voltage detection unit and the current value detected by the current detection unit, using a method that increases the dead times as the voltage value increases and reduces the dead times as the current value increases.

2. The isolated DC-DC converter according to claim 1, wherein on the basis of an increasing state of the current value, the control unit determines whether or not to take into account an excitation inductance of the transformer when determining at least one of the first dead time and the second dead time.

3. The isolated DC-DC converter according to claim 2, wherein when a rate of increase of the current value is less than or equal to a threshold, the control unit determines at least one of the first dead time and the second dead time taking into account the excitation inductance, and when the rate of increase of the current value is greater than the threshold, the control unit determines at least one of the first dead time and the second dead time without taking into account the excitation inductance.

4. The isolated DC-DC converter according to claim 1, wherein the voltage detection unit includes a secondary-side voltage measurement unit that measures a secondary-side voltage applied from the secondary-side coil of the transformer, and the voltage detection unit detects the voltage value on the basis of the secondary-side voltage measured by the secondary-side voltage measurement unit.

5. The isolated DC-DC converter according to claim 4, wherein the voltage detection unit obtains the voltage value on the basis of the secondary-side voltage and a turn ratio of the primary-side coil and the secondary-side coil.

6. The isolated DC-DC converter according to claim 4, wherein the isolated DC-DC converter is a step-down DC-DC converter that steps down an input voltage applied between the first conductive path and the second conductive path and outputs the output voltage.

7. The isolated DC-DC converter according to claim 2, wherein the voltage detection unit includes a secondary-side voltage measurement unit that measures a secondary-side voltage applied from the secondary-side coil of the transformer, and the voltage detection unit detects the voltage value on the basis of the secondary-side voltage measured by the secondary-side voltage measurement unit.

8. The isolated DC-DC converter according to claim 3, wherein the voltage detection unit includes a secondary-side voltage measurement unit that measures a secondary-side voltage applied from the secondary-side coil of the transformer, and the voltage detection unit detects the voltage value on the basis of the secondary-side voltage measured by the secondary-side voltage measurement unit.

9. The isolated DC-DC converter according to claim 5, wherein the isolated DC-DC converter is a step-down DC-DC converter that steps down an input voltage applied between the first conductive path and the second conductive path and outputs the output voltage.

* * * * *